United States Patent [19]
Covi et al.

[11] Patent Number: 5,029,038
[45] Date of Patent: Jul. 2, 1991

[54] DUAL RESISTANCE BUS CONNECTOR

[75] Inventors: Kevin R. Covi, Glenford; Donald P. Rearick, Shokan, both of N.Y.

[73] Assignee: International Business Machines Corporation, Armonk, N.Y.

[21] Appl. No.: 577,401

[22] Filed: Sep. 4, 1990

[51] Int. Cl.⁵ .............................................. H02H 9/00
[52] U.S. Cl. ..................................... 361/58; 307/130; 307/140; 439/801
[58] Field of Search ...................... 361/8, 9, 13, 15, 58; 307/125, 126, 130, 140, 141; 439/801

[56] References Cited

PUBLICATIONS

IBM Technical Disclosure Bulletin, "Replacing a Power Supply Under Microprocessor Control in an Operating System", vol. 27, No. 12, May 1985, pp. 7239-7241.

Primary Examiner—Gary F. Paumen
Attorney, Agent, or Firm—Mark S. Walker

[57] ABSTRACT

A dual resistance connector system is provided to allow the replacement of power regulators in a computer system without removing power from the operating voltage bus. The new power regulator can be "hot plugged" into the voltage bus without creating a voltage drop on the bus which could lead to voltage transients and logic errors. The low resistance bus bar is augmented by a retractable high resistance contact. The high resistance contact is configured to make electrical connection with the operating voltage bus before the low resistance contact. The establishment of a high resistance circuit allows charging of output filter capacitors without creating a large voltage drop on the operating voltage bus. As installation continues, the low resistance bus bar makes contact and is held in position by a fastener. The fastener is initially held out of electrical contact by a compression spring.

7 Claims, 2 Drawing Sheets

DUAL RESISTANCE BUS CONNECTOR

BACKGROUND OF THE INVENTION

1. Field of the Invention

The present invention relates to electrical connectors, more particularly, to electrical connectors for joining power regulators to a voltage bus. In particular, the present invention relates to a means of providing a bus bar connection with dual levels of resistance.

2. Background of the Invention

Power regulators for large computer systems such as the IBM ES/3090 supply power at low voltage (e.g., 1.4 V, 2.1 V, 3.6 V) and high current (on the order of several hundred amps), to the computer system. Typically, solid conductor bus bars connect this type of power supply to the voltage bus of the computer system. The solid bus bars are necessary to carry the high current flow.

Large computer systems supporting a department or corporation must be extremely reliable and have high availability. One way of increasing reliability is to include redundant components so that component function can continue even if one of the components fails. A particular computer system may have several power supplies and, by adding at least one additional spare power supply, can be configured to operate when one of the power supplies fails.

Replacement of a power supply while a computer system is operating introduces certain problems. In particular, connection of a replacement power supply to an operating voltage bus can lead to voltage transients on the bus resulting in irrecoverable logic errors. Transients occur because the output filter capacitors of the replacement power regulator are initially uncharged and, upon connection to an operating voltage bus, appear as a short circuit to the bus causing a momentary voltage drop on the bus while the capacitors are charged.

The prior art suggests several solutions to the problem of charging the output filter capacitors. One approach is to add isolation diodes to the power regulator output to prevent current flow from the voltage bus. Diodes operating in a low voltage, high current circuit such as described herein would operate at a very low level of efficiency and would generate considerable heat. Neither of these results is desirable in a power regulator for computer systems.

A second prior art solution is to provide a method of pre-charging the capacitors before connecting the power regulator to the voltage bus. This is described, for example, in IBM Technical Disclosure Bulletin Volume 27, No. 12, pp. 7239-7241. The disadvantage of this approach is that technician training and monitoring are required to ensure that the connection of the AC input power, the charging of the capacitors, and the final connection to the voltage bus occur in the proper sequence. Failure to follow the correct sequence could result in the undesirable voltage transients discussed above. A requirement for a two-step connection process increases the complexity and reduces the reliability of the overall system.

SUMMARY OF THE INVENTION

The apparatus of the present invention is designed to overcome the disadvantages of the prior art by providing a power regulator connection system with two levels of resistance so that initial contact does not result in large voltage drops on the system voltage bus. The system of the present invention is directed toward pre-charging power regulator filter capacitors without compromising the efficiency of the high current connection. The invention provides a connector with high resistance during initial contact but with low resistance when the connector is fully engaged and operational.

The present invention is directed to an apparatus for connecting a power regulator to a voltage bus while maintaining continuous operation of the voltage bus. The apparatus provides two electrical connectors, the second of which has electrical resistance greater than the first. The second connector is located so that it makes electrical contact with the voltage bus before the first, lower resistance connector makes contact.

DETAILED DESCRIPTION OF THE PREFERRED EMBODIMENT

The present invention will be described with reference to the drawings where like components are identically numbered. While the invention is described with reference to the preferred embodiment, this embodiment is not intended to limit the scope of the invention, which should be limited only by the language of the appended claims.

Figure 1:
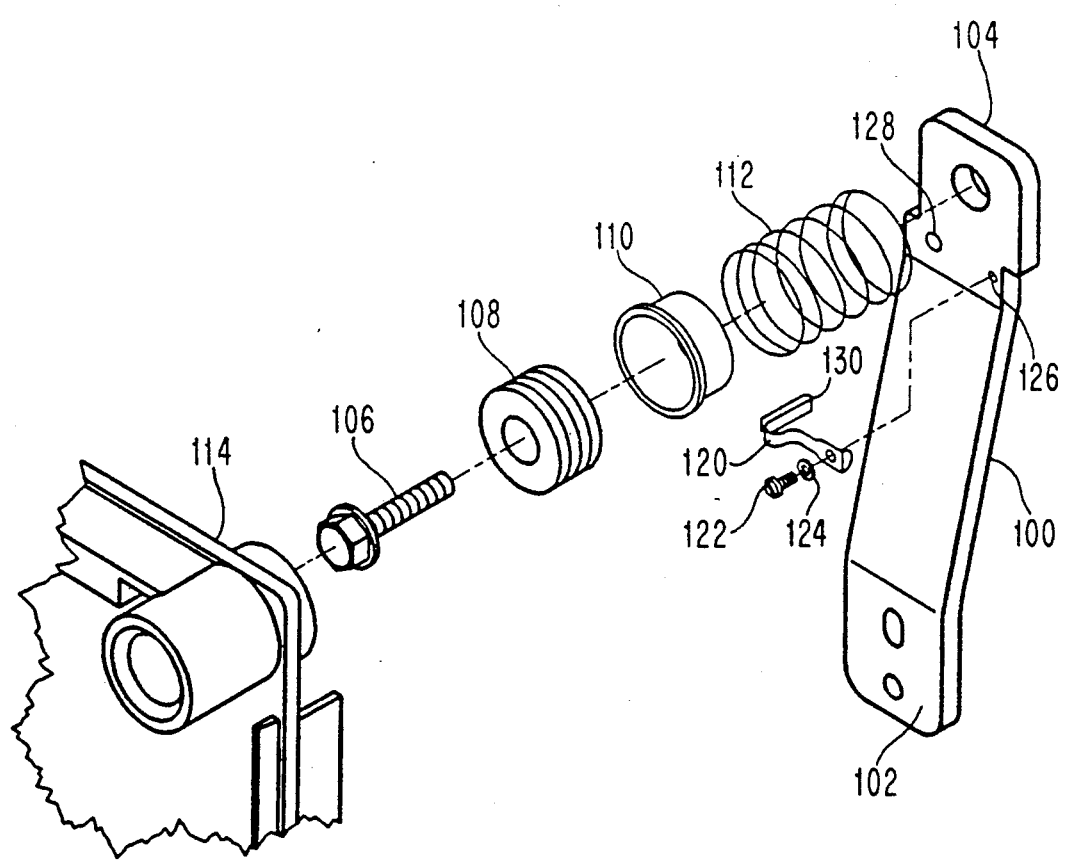
FIG. 1, is an exploded view of the connector system according to the present invention as incorporated into a power regulator package.

FIG. 1 is an exploded view of a bus bar connector portion of a power regulator. A power regulator will have two bus bars such as that shown in FIG. 1, one providing for positive and one for negative connection to the DC current voltage bus. Each of the bus bar connectors is identical and only one will be described.

Bus bar 100 is provided as a current path between the power regulator and the computer voltage bus. The power regulator (not shown) is connected to lower bus portion 102 while the voltage bus (not shown) connects to upper bus bar portion 104. The bus bar 100 is made of a highly conductive material such as copper.

The bus bar 100 is fastened in tight contact with the voltage bus by bolt 106. This bolt provides for a good electrical connection allowing low resistance current flow between bus bar 100 and the voltage bus. Belleville washers 108 are provided to ensure constant pressure of the bolt regardless of the significant variations in temperature arising during power supply operation. A metal ferrule 110 is provided to contain the Belleville washers and provide a contact point for spring 112.

Spring 112 holds ferrule 110, and therefore bolt 106, away from bus bar 100 when the bolt is not engaged to the voltage bus. This is important to ensure that a high resistance portion of the bus bar contacts the voltage bus before the highly conductive bolt 106. The bolt 106, washers 108, ferrule 110 and spring 112 are slidably mounted in a recess in a plastic housing 114.

A high resistance contact 120 is attached to bus bar 100 by a screw 122 and a washer 124. Screw 122 screws into hole 126 machined into bus bar 100. Other means of fastening, such as clipping or riveting, are within the scope of the invention.

High resistance contact 120 is, in the preferred embodiment, made from spring temper stainless steel. Stainless steel is used because it has a higher resistance than plain steel. In the preferred embodiment, contact 120 has a resistance of approximately 20 milliohms. The precise resistance value is not important but it must be high enough so that the voltage drop to the voltage bus during connection or contact is controlled. The output capacitors of the preferred embodiment take approximately 100 microseconds to charge. Therefore, the value of the resistor must be selected so that the capacitors will charge before the bus bar 100 makes contact with the voltage bus.

The cross section and length of the high resistance contact 120 are selected to provide the necessary resistance. The shape of contact 120 is selected to provide necessary spring function while having the requisite length.

Contact 120 is designed to fit through hole 128 formed in bus bar 100. Contact 120 must be spaced so that it is not in contact with the bus bar in the region of the hole. However, some contact during operation is permissible as long as the resistance path between the voltage bus and bus bar does not fall below the necessary minimum. The length of protrusion 130 is selected to ensure that the minimum necessary resistance exists at all times.

Spring temper steel is selected to allow repeated use of the high resistance contact. While other materials could be selected with higher resistance, they typically would not provide the reusability of spring steel. Many high resistance materials are malleable or brittle and would allow only a single use.

Figure 2:
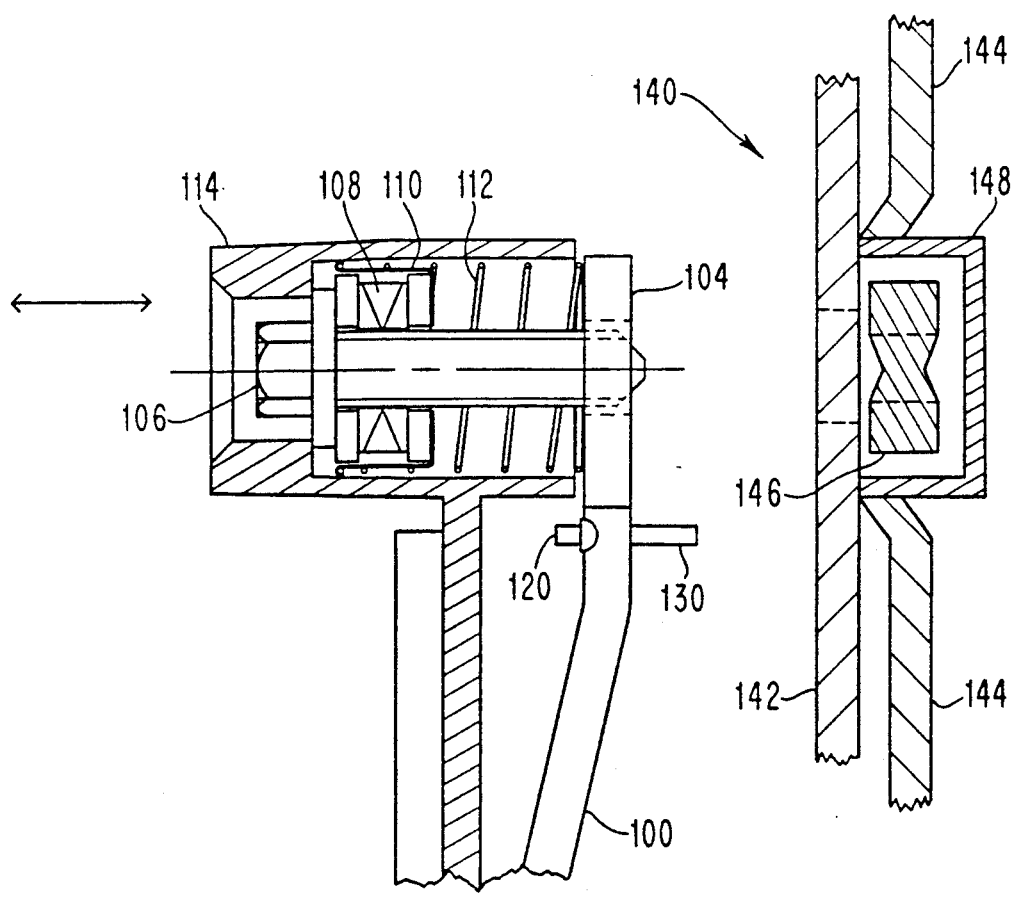
FIG. 2 is a sectional view of the connector system according to the present invention showing the relative geometry of the connector.

The protrusion 130 of contact 120 is more clearly shown in FIG. 2. The length of the protrusion is selected to ensure that contact 120 makes electrical contact with the voltage bus before bus bar upper portion 104 or bolt 106 makes electrical contact. FIG. 2 shows the voltage bus generally at 140. The voltage bus has voltage bus bars 142 and 144, representing positive and negative terminals. The connection to positive terminal 142 is shown in greater detail. Floating nut 146 is provided to receive and secure bolt 106. Nut 146 is held in position by retainer 148. In the preferred embodiment, contact protrusion 130 extends approximately three sixteenths of an inch beyond the face of upper bus bar portion 104. This length provides the necessary resistance during the insertion time for the power supply.

The dual resistance bus bar contact operates as follows. The computer operator or technician is notified of a power supply failure. The failed power supply is disconnected and removed from the voltage bus. A new power supply is selected and brought into position for mounting on the voltage bus. Prior to mounting, bolt 106 will be in its retracted position (as shown in FIG. 2) while high resistance contact 120 will protrude as shown at 130 in FIG. 2.

In the preferred embodiment, the power supply is guided into position by rails (not shown) that keep upper bus bar portion 104 substantially parallel to voltage bus 142. This mounting assembly assures that contact protrusion 130 makes contact with the voltage bus before any other part of the bus bar. The technician slides the power supply into position causing protrusion 130 to contact the voltage bus and charging the output filter capacitors. As mentioned above, a resistive protrusion will exist in both the positive and negative terminal bus bars so that the complete circuit is established with a resistance double that of high resistance contact 120.

The charging of the output capacitors is completed before upper bus bar portion 104 or bolt 106 contacts the voltage bus. Because the output capacitors charge quickly, the technician or operator inserting the power supply need not pause during insertion but can continue to slide the unit into its home position. When upper bus bar portion 104 is in contact with voltage bus, the technician uses a tool to tighten bolt 106. Bolt 106 is drawn tightly against upper bus bar portion 104 establishing tight electrical contact with the voltage bus 142. The pressure of the voltage bus causes protrusion 130 to be pushed back through the hole 128 in the bus bar. Although high resistance contact 130 will still be in electrical contact with the voltage bus, the presence of the low resistance path through bus bar 100 will mean that high resistance contact 130 does not impede current flow.

In the preferred embodiment, the electrical connection of the power supply to the voltage bus and to the AC power source occur simultaneously. Once the technician has tightened bolt 106 for each side of the power regulator, he or she then resets the protective circuit breakers and the power supply begins operation.

It will be understood from the foregoing description that various modifications and changes may be made in the preferred embodiment of the present invention without departing from its true spirit. It is intended that this description is for the purposes of illustration only and should not be construed in a limiting sense. The scope of the invention should be limited only by the language of the following claims.

This invention has been described with reference to the connection of a power regulator bus bar to an operating voltage bus. However, the concepts disclosed herein are applicable to any connector for connecting to operating busses, both voltage busses and logic busses, where it is important to control the initial contact current flow.

We claim:

1. A connector apparatus for connecting a power supply bus bar to a voltage bus while maintaining continuous operation of the voltage bus, said apparatus comprising:

first means for electrically connecting said bus bar to said bus, said first means having a first resistance;

second means for electrically connecting said bus bar to said bus, said second means having a second resistance higher than said first resistance; wherein said second means is located with respect to said first means such that said second means contacts said bus before said first means when said bus bar is being connected to said bus.

2. The connector of claim 1 wherein said second means protrudes through a hole formed in said first means.

3. The connector of claim 1 wherein said second means is a contact formed from stainless steel.

4. The connector of claim 1 wherein said second means is a spring contact formed from spring temper stainless steel and wherein said spring contact is depressed into a retracted position by said voltage bus.

5. A connector system for electrically connecting a first bus having an operating voltage to a second bus without voltage, said system comprising:

first connector means for electrically connecting said first bus to said second bus, said first connector having a first electrical resistance, second connector means for electrically connecting said first bus to said second bus, said second connector means located on said second bus to contact said first bus prior to contact by said first connector means as said second bus is connected to said first bus, and said second connector means having a second resistance higher than said first resistance to limit current flow from said first to said second bus.

6. The power supply as claimed in claim 5 wherein said second connector means is a spring formed from stainless steel.

7. The power supply of claim 5 wherein said second connector means is inserted through an aperture in said second contact and is electrically connected to said second contact.

* * * * *